United States Patent [19]

Bergmann

[11] 4,368,713

[45] Jan. 18, 1983

[54] GAS-OPERATED INTERNAL COMBUSTION ENGINE

[75] Inventor: Horst Bergmann, Esslingen, Fed. Rep. of Germany

[73] Assignee: Daimler-Benz Aktiengesellschaft, Stuttgart, Fed. Rep. of Germany

[21] Appl. No.: 184,914

[22] Filed: Sep. 8, 1980

[30] Foreign Application Priority Data

Sep. 8, 1979 [DE] Fed. Rep. of Germany ....... 2936422

[51] Int. Cl.³ ............................................. F02M 13/08
[52] U.S. Cl. ............................ 123/527; 123/DIG. 11
[58] Field of Search .................... 123/525, 527, 276 E, 123/179 G, 513, DIG. 11; 48/180 R

[56] References Cited

U.S. PATENT DOCUMENTS

| | | | |
|---|---|---|---|
| 3,184,295 | 5/1965 | Baverstock | 123/525 |
| 3,650,254 | 3/1972 | McJones | 123/527 |
| 3,982,516 | 9/1976 | Abernathy | 123/27 GE |
| 4,040,403 | 8/1977 | Rose et al. | 123/527 |
| 4,188,919 | 2/1980 | Bruce | 123/527 |
| 4,290,402 | 9/1981 | Bergmann | 123/527 |

Primary Examiner—Charles J. Myhre
Assistant Examiner—E. Rollins Cross
Attorney, Agent, or Firm—Paul M. Craig, Jr.

[57] ABSTRACT

A gas-operated internal combustion engine which includes a volume control valve for a gas supplied to an air/gas mixer. An air filter is arranged within a charged air supply arrangement and, between a diaphragm of the volume control valve in a section of the air charge supply, a pressure equalizing connection is provided which, starting from the air filter or from the air/gas mixer and extending in a direction toward the volume control valve includes a throttle and a blocking biased check valve. A conduit branches off in the pressure-equalizing line at a point between the air filter and the check valve, with the conduit leading through a diaphragm operated valve to the intake manifold. The valve is controllable by the intake manifold vacuum such that the conduit is blocked with a high value intake manifold vacuum and opened with a low value intake manifold vacuum. The conduit may also branch off from the pressure equalizing line at a point between the check valve and volume control valve with the conduit leading through two series connected diaphragm operated valves controllable by the intake manifold vacuum.

17 Claims, 5 Drawing Figures

GAS-OPERATED INTERNAL COMBUSTION ENGINE

The present invention relates to an internal combustion engine and, more particularly, to a gas-operated internal combustion engine which includes a volume control valve for supplying gas to an air/gas mixer, wherein a valve, which controls the gas stream and is biased in a closing direction by a spring force, is adjustable by means of a diaphragm adapted to be acted upon an opening direction from the operating side by a vacuum ambient in the gas on a downstream side of the volume control valve, a rear of the diaphragm is exposable to a control pressure and an air filter is arranged within the charging air supply to the working cylinders of the engine forwardly of the air/gas mixer, downstream of which is arranged a throttle valve, and wherein, between a rear of the diaphragm of the volume control valve, on the one hand, and a section of the charging air supply at or in front of the air gas mixer, on the other hand, a pressure equalizing connection is provided which, starting from the air filter or from the air/gas mixer, includes a throttle, and in a direction toward the volume control valve, includes a blocking biased check valve.

The most important operating parameters for a proper operation of a gas/operating internal combustion engine, especially for motor vehicles, are the air/fuel ratio. The values for full-load operation are predetermined on a basis of corresponding drive power requirements with relatively rich air/fuel mixture values. The rich mixture values also apply, in part, over a large range during a partial load operation of the engine. Consequently, not only is there an increase in specific fuel consumption but there is also an increase in the emissions of HC, NO, and CO pollutants.

The aim underlying the present invention essentially resides in providing a gas-operated internal combustion engine wherein control pressure characteristics for the volume control valve of the internal combustion engine are regulated in such a manner that the control pressure characteristic is highest closely near a full load operation of the engine and has a falling tendency in a direction of an idling operation of the internal combustion engine.

In accordance with advantageous features of the present invention, a conduit branches off from a pressure equalizing line at a point between the air filter housing and check valve. The conduit leads, through a diaphragm operated open-shut valve, to an intake manifold of the internal combustion engine. The valve is controllable by an intake manifold vacuum against a force of a return spring in such manner that, with a high intake manifold vacuum, the conduit is preferably blocked and; with a low value intake manifold, is passable toward the intake manifold under a throttling effect.

To obtain an optimum characteristic in the control pressure-load diagram and/or an improved adaptation to the operating conditions of the internal combustion engine, in accordance with further features of the present invention, a conduit may branch off from the pressure equalizing line at a point between the check valve and volume control valve, with the conduit passing, through two functionally series connected diaphragm-operated on and off or open and shut valves and through a throttle, to the gas mixture of the internal combustion engine. The on/off valves, which are controllable by intake manifold vacuum against a force of return springs, are constructed so as to have mutually opposed operating and resetting positions as well as differing switching points from a pressure viewpoint.

By virtue of the features of the present invention, pollutant emissions and fuel consumption may be reduced to a minimum. Additionally, the main gas line, when fuel is in a liquid state, may be shut-off when the ignition is turned off and/or when the engine is at a standstill and the on and off valve or valves connected to the engine intake manifold may be opened as soon as the vacuum has been built-up, which vacuum is produced during a starting of the internal combustion engine.

The operating point of the check valve of the internal combustion engine arrangement of the present invention may be constructed so that the valve opens only upon an incipient contamination of the filter. An effect on the air/gas mixture is produced only in the partial load range and/or when the air filter has become contaminated. Consequently, the provision of the check valve affords the further advantage that the internal combustion engine may be operated at a mainimum main gas throttle and, consequently, manipulations performed on the gas system with respect to the output are extensively ineffective.

A partial-load thinning of the fuel-air mixture may also be attained by exposing a rear of the diaphragm of the volume control valve to a vacuum in dependence upon the intake manifold vacuum by, for example, the provision of two additional nozzles whereby the compensating system may be overridden or overruled thereby. However, an opening resistance of the check valve must be increased in such a situation so that no thinning of the fuel-air mixture occurs during nominal power. In order to stabilize idling operation of the internal combustion engine, a thinning in this operating range becomes ineffective by the on and off or open and shut valve operated by the intake manifold vacuum.

Accordingly, it is an object of the present invention to provide a gas operated internal combustion engine which avoids, by simple means, shortcomings and disadvantages encountered in the prior art.

Another object of the present invention resides in providing a gas operated internal combustion engine which minimizes the emission of pollutants during operation thereof.

Yet another object of the present invention resides in providing a gas-operated internal combustion engine which enables the minimizing of fuel comsumption thereof.

A further object of the present invention resides in providing the gas-operated internal combustion engine which functions reliably under all operating conditions.

A still further object of the present invention resides in providing a gas-operated internal combustion engine which insures an optimum air/fuel ratio during all operating ranges thereof.

These and other objects, features, and advantages of the present invention will become more apparent from the following description when taken in connection with the accompanying drawing which shows, for the purposes of illustration only, two embodiments in accordance with the present invention, and wherein.

Figure 1:
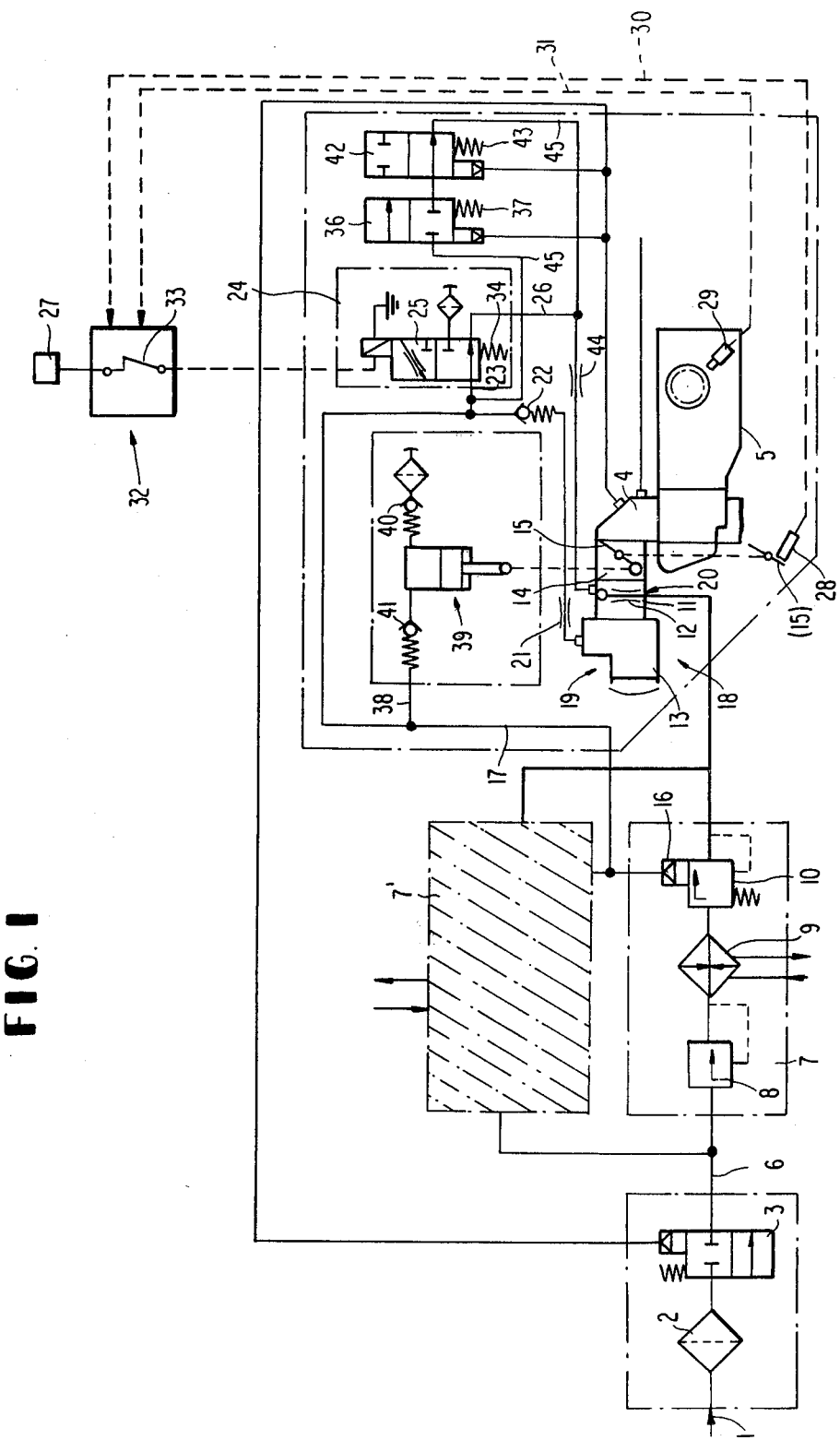
FIG. 1 is a functional schematic diagram of a gas-operating internal combustion engine in accordance with the present invention.

Referring now to the drawings wherein like reference numerals are used throughout the various views to designate like elements and, more particularly, to FIG. 1, according to this figure, fuel in a liquid state passes from a gas tank (not shown) through a main valve 1 and a gas filter insert 2 to a 2/2 way vacuum valve 3. The vacuum valve 3 is exposed to vacuum from an intake manifold 4 of an internal combustion engine 5 in such a manner that when the internal combustion engine 5 is in operation, the vacuum valve 3 is exposed to a through-flow. The gas, still in a liquid phase, passes from an outlet of the vacuum valve 3 through a conduit 6 to a converter 7, of a conventional construction, wherein the gas in the liquid phase is converted into a gaseous phase. In general, one converter is sufficient for operation of an internal combustion engine; however, in an extreme case such as, for example, in situations where the temperatures are below a minus 20° C., a parallel-connected further converter 7' may be required.

The converter 7 includes a pressure-reducing valve 8, a vaporizer 9, and a vacuum-controlled volume regulating valve 10. The vaporizer 9 is connected to a cooling unit (not shown) such as a radiator of the internal combustion engine 5. A conduit leads from the vacuum controlled volume regulating valve 10 to a gas mixer 11 having arranged therein a fixed throttle 12, predetermined in dependence upon power requirements of the internal combustion engine 5. The gas mixer 11 is in communication with an air filter 13 and with a throttle pipe or conduit 14 having a throttle valve 15 arranged therein. The throttle pipe 14 is connected to the internal combustion engine 5 by the intake manifold 4.

A pressure-equalizing connection 17 is provided at a rear side 16 of the volume control valve 10. The pressure-equalizing connection 17 is adapted to place the volume control valve 10 in communication with the charge or air supply generally designated by the reference numeral 18 arranged at or in front of the air/gas mixer 11. Beginning in an air filter housing generally designated by the reference numeral 19 and/or at a housing generally designated by the reference numeral 20 of the air/gas mixer 11, a throttle 21 and check valve 22 are provided, with the check valve 22 being biased so as to block a flow in a direction toward the volume control valve 10. A branch conduit 23 emanates from between the check valve 22 and volume control valve 10, with a reversing valve 24 being arranged in the branch conduit 23. The reversing valve 24 enables the branch conduit 23 to be selectively connected through a throttle 25 to the atmosphere 4, without impediment through a line 26 to vacuum ambient in the intake manifold 4.

The reversing valve 24 is constructed as a 3/2-way valve and may be electromagnetically operated. The reversing valve 24 is functionally connected in parallel with an ignition switch 27 in such a manner that, with the ignition switch in an on position, the electromagnet of the reversing valve 24 is in an operative position and the branch conduit 23 is connected in a throttled manner by the throttle 25, to the atmosphere. When the electromagnet of the reversing valve 24 is deenergized, the branch conduit 23 is connected to the intake manifold 4.

A position scanner 28, of conventional construction, is provided for at least indirectly determining a closed position of the throttle valve and transmitting an electrical signal of the scanned position of the throttle valve 15. A revolution counter 29, of conventional construction is also arranged at the internal combustion engine for sensing the rotational speed of the internal combustion engine and transmitting an electrical signal of the sensed rotational speed. The electric signals from the position scanner 28 and revolution counter 29 are conducted through lines or connections 30, 31 to a conventional logic circuit generally designated by the reference numeral 32.

The logic circuit 32 includes, for example, a normally closed switch 33 which is opened when the throttle valve 15 is closed and when the speed of the internal combustion engine 15 rises beyond a predetermined idling speed whereby the logic circuit 32 interrupts a connection or line to the ignition switch 27. With the connection to the ignition switch 27 being interrupted, the electromagnet of the reversing valve 24 is not supplied with current and a spring 34 of the reversing valve 24 retains the valve 24 in a position wherein the pressure equalizing connection 17 is directly connected to the intake manifold 4 through the branch conduit 23 with the ignition remaining turned on. A logic circuit 32 is constructed so that the switch 33 is turned off even if the throttle valve 15 is opened, that is, when a permissible maximum speed of, for example, 2,500 r.p.m. is exceeded.

An acceleration pump generally designated by the reference numeral 39 is coupled with the throttle valve 15 or with an operating linkage thereof. A pressure line or nipple 38 of the acceleration pump 39 terminates in the pressure equalizing connection 17. The acceleration pump 39 is provided with a suction valve 40 and a vacuum valve 41. The pressure line 38 is arranged at a point in the pressure-equalizing conduit 17 between the check valve 22 and the vacuum-controlled volume regulating or control valve 10. The check valve 41 is biased so that when the solenoid or electromagnet of the reversing valve 24 is not supplied with current, a sufficiently high vacuum exists in the pressure-equalizing conduit 17 which is adequate for blocking a gas feed through the vacuum-controlled volume regulating or control valve 10.

Figure 2:
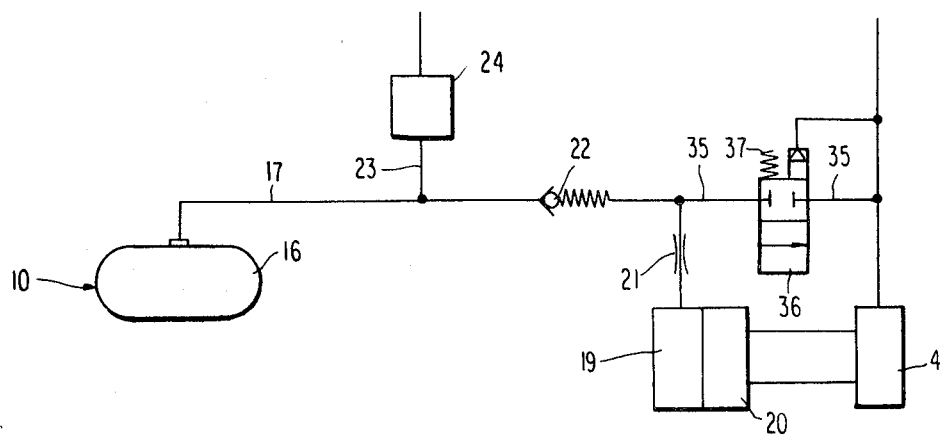
FIG. 2 is a fragmentary schematic view of a control means for a pressure curve of a volume control valve for the engine of FIG. 1.

As shown in FIG. 2, a conduit 35 branches off from the pressure-equalizing line 17 a point between the air filter housing 19 and the check valve 22. The conduit 35 leads, through an on/off valve 36 to the intake manifold for the internal combustion engine 5. The valve 36 may be constructed, for example, as a diaphragm operated 2/2 valve and may be controllable by the intake manifold vacuum against a force of the return spring 37 in such a manner that, with a high value intake manifold vacuum, the conduit 35 is preferably blocked off; however, with a low value intake manifold vacuum, the valve 36 is passable under a throttling effect.

Figure 2A:
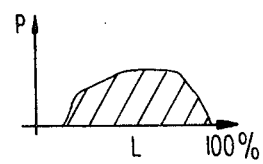
FIG. 2a is a control pressure-load diagram relating to the construction of FIG. 2.

FIG. 2a provides a diagram illustrating the controlled pressure p versus a load L of the internal combustion engine attainable by construction such as illustrated in FIG. 2. As shown in FIG. 2a, a maximum controlled pressure in the full load range respectively drops toward partial load range and idling of the internal combustion engine 5.

Figure 3:
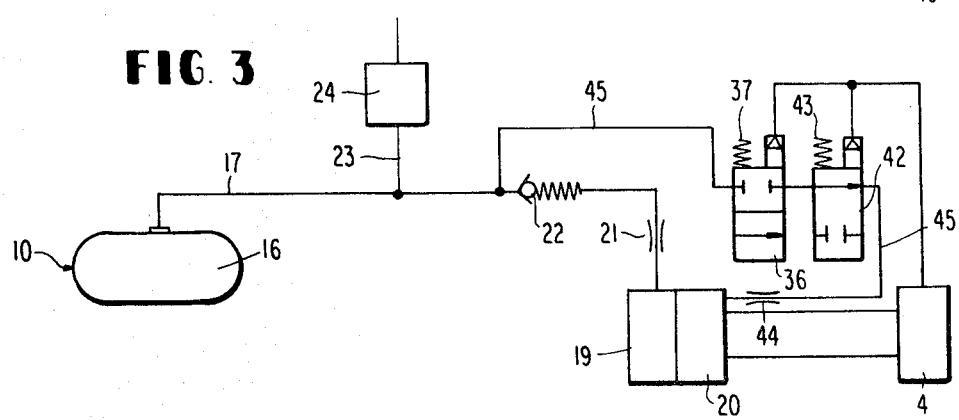
FIG. 3 is a fragmentary view of another embodiment of a control means for the pressure curve for the volume control valve of the gas-operated internal combustion engine in accordance with the present invention.
Figure 3B:
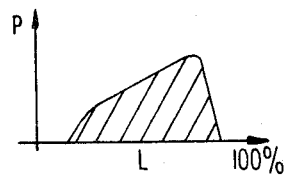
FIG. 3a is a control pressure-load diagram relating to the embodiment of FIG. 3.

As shown in FIG. 3, in addition to the diaphragm-/controlled on/off valve 36, it is also possible to provide another diaphragm operated on/off valve 42 which is functionally connected in series with the valve 36 in such a manner that the operating and rest positions of the respective valves 36, 42 are mutually opposed to each other and with the two valves 36, 42 each having differing switching points with respect to pressure. The valve 42 is adapted to be operated against a force of a return spring 43 and is connected on an intake side to the air/gas mixer housing 20 by means of a conduit 45 provided with a throttle 44.

As shown in the diagram of the control pressure p versus the load L of FIG. 3a, an optimum controlled pressure curve is thus obtained with a maximum control pressure p closely beneath a full load, that is, 100%, and a constantly falling tendency in a direction toward idling.

In order to insure compensation for contamination of the air filter 13, the valves 36, 42 must be exposed into or acted upon by pressure between the volume control valve 10 and the check valve 22. The operating point of the check valve 22 is selected so that an opening of the valve 22 takes place only with an incipient contamination of the filter, that is, a rise in vacuum.

While I have shown and described only two embodiments in accordance with the present invention, it is understood that the same is not limited thereto but is susceptible of numerous changes and modifications as known to one having oridinary skill in the art and I therefore do not wish to be limited to the details shown and described herein, but intend to cover all such modifications as are encompassed by the scope of the appended claims.

I claim:

1. A gas-operated internal combustion engine which includes an air-gas mixer means, a volume control valve means for controlling a supply of gas to the mixer means, means arranged forwardly of the mixer means for supplying an air charge to the engine, pressure equalizing connection means arranged between a rear of the volume control valve means and the air charge supplying means, and a check valve means arranged between the air charge supplying means and the volume control valve means, the check valve means being adapted to open in a direction toward the air charge supplying means, characterized in that a conduit means branches off from the pressure equalizing connection means at a point between the air charge supplying means and the check valve means, the conduit means extends to an intake manifold of the engine, a valve means is arranged in the conduit means for controlling communication between the pressure equalizing connection means and the intake manifold, and in that a positioning of the valve means in the conduit means is controllable by vacuum of the intake manifold such that with a high value intake manifold vacuum the valve means in the conduit means is in a closed position blocking the conduit means and with a low value intake manifold vacuum the valve means in the conduit means is in an open position communicating the pressure equalizing connection means with the intake manifold under a throttling effect.

2. A gas-operated internal combustion engine which includes an air-gas mixer means, a volume control valve means for controlling a supply of gas to the mixer means, means arranged forwardly of the mixer means for supplying an air charge to the engine, pressure equalizing connection means arranged between a rear of the volume control valve means and the air charge supplying means, and a check valve means arranged between the air charge supplying means and the volume control valve means, the check valve means being adapted to open in a direction toward the air charge supply means, characterized in that a conduit means branches off from the pressure equalizing connection means at a point between the check valve means and the volume control valve means, the conduit means extends to a mixer means, a pair of series connected valve means are arranged in the conduit means for controlling communication between the pressure-equalizing connection means and the mixer means, the pair of valve means are controllable by vacuum of the intake manifold of the internal combustion engine, and in that the pair of valve means have mutually opposed operating and rest positions and are adapted to be switched between the positions in response to different pressures.

3. A gas-operating internal combustion engine according to claim 2, characterized in that a throttle means is arranged between the mixer means and the second pair of valve means.

4. A gas-operating internal combustion engine according to claim 3, characterized in that the pair of valve means are each adapted to be operated by a diaphragm.

5. A gas-operating internal combustion engine according to one of claims 1 or 4, characterized in that the charge air supplying means includes a housing, air filter means are accommodated in the housing forwardly of the mixer means, and in that a throttle means is arranged in the pressure equalizing connection means between the air charge supplying means and the check valve means.

6. A gas-operating internal combustion engine according to claim 5, characterized in that the check valve means is operable to open only with an incipient contamination of the air filter means.

7. A gas-operating internal combustion engine according to claim 6, characterized in that a reversing valve means is provided, further conduit means are provided for connecting the reversing valve means with the pressure-equalizing connection means, and in that the reversing valve means is operable in one position to vent the further conduit means and in a second position to connect the further conduit means to the intake manifold.

8. A gas-operating internal combustion engine according to claim 7, wherein an ignition switch means is provided for controlling a starting of the internal combustion engine, characterized in that the reversing valve means is an electromagnetic valve, means are provided for connecting the electromagnetic valve to the ignition switch means, and in that means are provided for selectively interrupting the connection between the ignition switch means and the electromagnetic valve in dependence upon operating conditions of the internal combustion engine.

9. A gas-operating internal combustion engine according to claim 8, characterized in that the interrupting means includes a scanning means for scanning a position of a throttle valve of the engine and for providing an output signal of a scanned position, means for sensing a rotational speed of the internal combustion engine and for providing an output signal of a sensed rotational speed, and logic circuit means interposed between the ignition switch means and the reversing valve means for receiving the output signals from the scanning means and the sensing means and for interrupting a supply of current to the electromagnetic valve upon receipt of predetermined output signals.

10. A gas-operating internal combustion engine according to claim 9, characterized in that an acceleration pump is operatively connected with the throttle valve of the internal combustion engine, means are provided for connecting the acceleration pump with the pressure-equalizing connection means at a point between the check valve means and the volume control valve means, and in that the acceleration pump includes means for insuring an existence of a sufficiently high vacuum in the equalizing pressure connection means to enable a blocking of a supply of gas from the volume control valve means when the supply of current to the electromagnetic valve is interrupted.

11. A gas-operating internal combustion engine according to claim 10, characterized in that the blocking means includes a check valve means.

12. A gas-operating internal combustion engine according to one of claims 1 or 4, characterized in that the charge air supplying means includes an air filter means disposed forwardly of the mixer means, and in that the check valve means is operable to open only with an incipient contamination of the air filter means.

13. A gas-operating internal combustion engine according to one of claims 1 or 4, characterized in that a reversing valve means is provided, further conduit means are provided for connecting the reversing valve means with the pressure-equalizing connection means, and in that the reversing valve means is operable in one position to vent the further conduit means and in a second position to connect the further conduit means to the intake manifold.

14. A gas-operating internal combustion engine according to claim 13, characterized in that the reversing valve means is an electromagnetic valve, means are provided for connecting the electromagnetic valve to the ignition switch means, and in that means are provided for selectively interrupting the connection between the ignition switch means and the electromagnetic valve in dependence upon operating conditions of the internal combustion engine.

15. A gas-operating internal combustion engine according to claim 14, characterized in that the interrupting means includes a scanning means for scanning a position of a throttle valve of the engine and for providing an output signal of a scanned position, means for sensing a rotational speed of the internal combustion engine and for providing an output signal of a sensed rotational speed, and logic circuit means interposed between the ignition switch means and the reversing valve means for receiving the output signals from the scanning means and the sensing means and for interrupting a supply of current to the electromagnetic valve upon receipt of predetermined output signals.

16. A gas-operating internal combustion engine according to claim 15, characterized in that an acceleration pump is operatively connected with the throttle valve of the internal combustion engine, means are provided for connecting the acceleration pump with the pressure-equalizing connection means at a point between the check valve means and the volume control valve means, and in that the acceleration pump includes means for insuring an existence of a sufficiently high vacuum in the equalizing pressure connection means to enable a blocking of a supply of gas from the volume control valve means when the supply of current to the electromagnetic valve is interrupted.

17. A gas-operated internal combustion engine which includes an air-gas mixer means, a volume control valve means for controlling a supply of gas to the mixer means, means arranged forwardly of the mixer means for supplying an air charge to the engine, pressure equalizing connection means arranged between a rear of the volume control valve means and the air charge supplying means, and a check valve means arranged between the air charge supplying means and the volume control valve means, the check valve means being adapted to open in a direction toward the air charge supplying means, characterized in that a conduit means branches off from the pressure equalizing connection means at a point between the air charge supplying means and the check valve means, the conduit means extends to an intake manifold of the engine, and means in the conduit means controllable by vacuum of the intake manifold for blocking the conduit means in response to a high value intake manifold vacuum and for communicating the pressure equalizing connection means with the intake manifold under a throttling effect in response to a low intake manifold vacuum.

* * * * *